United States Patent [19]

Neu

[11] Patent Number: 4,608,164

[45] Date of Patent: Aug. 26, 1986

[54] MEMBRANE FILTER PLATE

[75] Inventor: Werner Neu, Langenhagen, Fed. Rep. of Germany

[73] Assignee: Hansen-BTR GmbH, Hanover, Fed. Rep. of Germany

[21] Appl. No.: 697,072

[22] Filed: Jan. 31, 1985

[30] Foreign Application Priority Data

Jan. 31, 1984 [DE] Fed. Rep. of Germany ....... 3403163
Jun. 18, 1984 [DE] Fed. Rep. of Germany ....... 3422574
Jul. 2, 1984 [DE] Fed. Rep. of Germany ....... 3424325
Aug. 27, 1984 [DE] Fed. Rep. of Germany ....... 3431401

[51] Int. Cl.⁴ ............................................. B01D 25/12
[52] U.S. Cl. ..................................... 210/231; 210/232; 210/541
[58] Field of Search ......................... 210/231, 224–230, 210/232, 541; 100/295–297

[56] References Cited

U.S. PATENT DOCUMENTS 3,497,065  2/1970  Johnson ............................. 210/231
4,508,623  4/1985  Heckl et al. ........................ 210/231

FOREIGN PATENT DOCUMENTS

3220487  5/1982  Fed. Rep. of Germany .

Primary Examiner—Frank Sever
Attorney, Agent, or Firm—Robert E. Burns; Emmanuel J. Lobato; Bruce L. Adams

[57] ABSTRACT

A membrane filter press comprises a plurality of one piece plastic base plates having on opposite sides recesses each bounded by a lower inner peripheral portion surrounded by a higher outer peripheral portion. In the lower inner peripheral portion of the base plate there is a circumferential groove. On each side of the base plate there is a membrane of elastomeric material. The membrane is planar in unstressed condition and has a marginal portion seated on the lower inner peripheral portion of the base plate. A rib on the membrane is received in the circumferential groove of the base plate. An inlet for a suspension to be filtered provides inlet passages into spaces between filter cloths of adjacent filter units. At a position for filtrate outlet, passages in the membrane and the base plate connect with a filtrate outlet opening. Passages are provided in the base plate for introducing compressed air between the base plate and the membrane to compress the filtered-out solids into a filter cake at the end of a filtering cycle.

21 Claims, 17 Drawing Figures

MEMBRANE FILTER PLATE

FIELD OF INVENTION

The invention relates to a membrane filter plate comprising a plate-form base member with at least one recess which at its edge passes through an inclined surface and a step into the plane of a frame-like border of the base member and at least one membrane of elastomeric material of a smaller surface area with a thickened edge portion with a circumferential rib which seats in a circumferential groove in the base member.

BACKGROUND OF THE INVENTION

A membrane filter plate of this kind is known from DE-OS No. 19 60 821. The base member is here made of a frame in which a cup-shaped plate is welded. Its edge forms with a step-form recess in the edge of the base member a swallow-tail groove which serves for securing the membrane. The membrane is made cup-shaped and has a border for clamping which on its outer edge carries a swallow-tail form rib directed toward the base member and pressed into the swallow-tail groove. The membrane is thereby held securely in place even when the filter plate press is opened and the pressed filter cake is removed. However, with this filter membrane plate, the membrane does not have as long a useful life as is known for other membranes of the same elastomeric material.

It has been supposed that the shortening of the useful life of the diaphragm is attributable to the stress applied to the material through the high pressure to which it is subjected in the filter plate press. To increase the useful life of the membrane, there is proposed in DE-OS No. 23 22 044 a membrane filter plate designed to work with lower pressure. With this, the plane edge of the base member has a swallow-tail form groove in which is received a swallow-tail form rib provided on the outer edge of the membrane. Two membranes lie on the adjacent base member. The edge planes of the base member in the pressed condition of the membrane filter plates, a spacing which corresponds to twice the edge thickness of one membrane. The force of the filter plate press is here transmitted only by the membrane edge. With lower filter pressure, this is a practical possibility. However, with higher filter pressure, the pressure of the filter plate press must be raised in order to obtain the required sealing. The pressure transmission from the membrane edge to membrane edge leads to a flow of the elastomeric material of the membrane whereby the useful life of the membrane is further shortened.

The invention has recognized that the shortened useful life of these known membranes is attributable to the form of the membrane. In order to press the remaining fluid from the filter material at the end of a filter operation, the membrane is acted upon by compressed air which is introduced between the base member and the membrane. This compressed air compacts the filter cake. Hereby the membrane is subjected to a surface area reduction which is attainable in a cup-shaped membrane only through folding. However, folding extraordinarily shortens the useful life of an elastomeric work piece.

With both of the known membrane filter plates, the cup-shaped construction is required in order to obtain a satisfactory fastening of the membrane to the base member. In the filter presses in which these membrane filter plates comprise many members installed parallel to one another, the slurry, that is the yet unfiltered suspension of solid particles in a fluid, is introduced under considerable pressure (10 bar) into the cavities between filter cloths stretched between two adjacent membrane through panels running inside the membrane filter plates which connect individual cavities with one another. Thereby the slurry must not enter into the cavities between the filter cloths and the membranes or the cavities between the membranes and the base members.

In EP-0S No. 0030905, introduction of the slurry into the membrane filter plates is effected through an opening in the membrane filter plate and a device installed in this opening to secure membranes and filter cloths on both sides of a base member, such device comprising two pieces of tubing provided with flanges which are inserted through an opening in the base member, the membranes and the filter cloths and connected with one another and the flanges of which press the filter cloths and the membranes against the filter plate. These pieces of tubing are pressed of sheet metal. With one of them, the free end of one piece of tubing is bent over for the fastening operation. Such manner of fastening is only possible where the filter cloths are either generally not, or only rarely changed. For a changing of the filter cloths, it is necessary that the piece of tubing bent over to form a flange must be so bent that it cannot be used again. Moreover, the other piece of tubing is usually also damaged. The required production of the pieces of tubing out of sheet metal limits the use of the filter plate thus agressive slurries cannot be filtered. The filter cloths let the filtrate through but hold back the solid particles in the space between two filter cloths. The filtrate is thereupon conducted out of the space between the filter cloths and the membranes through channels into a filtrate discharge channel which penetrates all of the membrane filter plates installed in the filter press.

SUMMARY OF THE INVENTION

The invention avoids these objections. It is an object of the invention to provide a membrane of simple configuration and long life which is simple to produce, is simple and safe to secure on the base member and will satisfactory also filter aggresive filter substances.

The invention resides in that the membrane, when not stressed by pressure is planar, that the groove in the base member is arranged in or immediately adjacent to the inclined face bounding the recess, that the edge of the membrane with the rib has an angle profile, that the outer edge of the membrane is formed wedge-shaped in cross-section and the side of the membrane lying on the base plate is greater that the side turned away from the base plate and that the border of the recess outside the circumferential groove has a depth which corresponds to the thickness of the membrane edge less an elastic compression height, whereby the frame-form edge of the base member not covered by the membrane forms the sealing face.

The membrane edge is here formed in the nature of an angle of which one side is directed outwardly and the other side lies on the base member. Thereby is the end of the outwardly directed side so formed that a clamping of the inserted membrane on the base member is achieved. The production form for the base member and the membrane is thereby simplified and the fastening of the membrane is easy to achieve and secure. The membrane is characterized by a long useful life. As the membrane is planar when not stressed by pressure, it is streched when stressed by pressure in the filtering operation. Elastomeric material can withstand such stressing without decreasing its useful life. A folding of this membrane does not occur in any operating condition. As the edge of the recess outside the circumferential groove has a depth which corresponds to the thickness of the membrane less an elastic compression height, the pressure of the membrane edge is limited even with high pressure. For the high pressure is not transmitted from the portion of the frame-form edge of the base member not covered by the membrane which at the same time forms the sealing surface.

It is advantageous when the walls of the ribs, as well as the walls of the groove are parallel to one another. A simple geometry is thereby obtained. This simple geometry means an economy in production costs of the mold for the base member as also the mold for the membrane.

The production is further simplified in that the groove walls as well as the walls for the rib are perpendicular to the plane of the edge of the base member as also the edge of the membrane.

Similarly simple to the fastening of the edge of the membrane is the fastening of the edge of the opening for the inlet of the suspension when spaced from the edge of the opening there is arranged a rib on the membrane and a groove in the base member whereby the membrane is clamped on the base plate by a screwed joint.

The screwed joint serving for this purpose is advantageously so formed that the screwed joint is three-part and is formed of two piped pieces provided with flanges, that one pipe piece of the screw joint has an internal thread in which is screwed the external thread of the pipe piece of a middle screwed joint part with a flange on which the second screwed joint part with the pipe piece in the flange is freely rotatable and axially slidable between the flange and the first screwed joint part, that the flange of the screwed joint part lying on the filter cloth and the membrane is so thick that it projects to the plane of the edge sealing or slightly beyond this in the uncompressed condition of the filter, and that the flange of the screwed joint part lying on the filter cloth and membrane has at least one radial recess.

The advantage of this screwed joint resides in that its parts can be formed wholly of plastic material. For by the screwing in of the screwed joint, the parts are only screwed in so that they sit relatively loosely in the opening of the ground base member. As the end faces of the flanges of adjacent membrane filter plates lie on one another, the membrane through the flange is first fully pressed on the base member when the filter plate press is put under pressure. As the two outer flange parts of this construction are moveable relative to one another, only limited tension forces occur in the plastic parts while high compressive forces can occur, which however, are not harmful to the plastic parts.

It is advantageous when on the bottom of the groove there is provided a projection or protuberance. A better sealing is thereby obtained.

The production of filter plates in large numbers is simplified when the members are produced in one piece of plastic material, preferably polypropylene.

In order to form the filtrate outlet in the region of the membrane so that no untightness between the membrane and the base member occurs and a satisfactory outflow of the filtrate is assured even when the filter material is acted upon by compressed air in the space between the membrane and the outer surface of the recesses in the base members, it is advantageous that the frame-like reinforcing in the region of the filtrate outlet is divided into two webs, that a recess for outflow of the filtrate is provided between the two webs and that the inner web has a plurality of transverse channel-like recesses.

It is hereby attained that the frame-like reinforcement divides its sealing function and that the filtrate collecting between the filter cloth and the membrane can flow satisfactorily through the channel-like recesses of the membrane filter plate. These channel-like recesses cannot be closed either by the pressure of the filter press nor under the pressure of the compressed air between the membrane and the base member and thereby assure satisfactory carrying off of the filtrate in all conditions of operation.

It is advantageous when from the parts of the inner web between the canal-like recesses tongues extend in the direction of the middle region of the membrane. These tongues serve to extend the reinforcing function of the region between the canal-like recesses further in the direction toward the middle region of the membrane.

It is advantageous when the tongues have the same height as the inner web. They can then exercise their reinforcing function especially well.

It is advantageous when around the opening or openings on the side of the membrane turned toward the base member, there is provided an annular projection which expediently is provided on its side with sealing lips. The sealing between the base member and the membrane is thereby substantially improved.

BRIEF DESCRIPTION OF DRAWINGS

The nature, objects and advantages of the invention will be more fully understood from the following description of the preferred embodiments shown by way of example schematically in the accompanying drawings in which.

DESCRIPTION OF PREFERRED EMBODIMENTS

Figure 1:
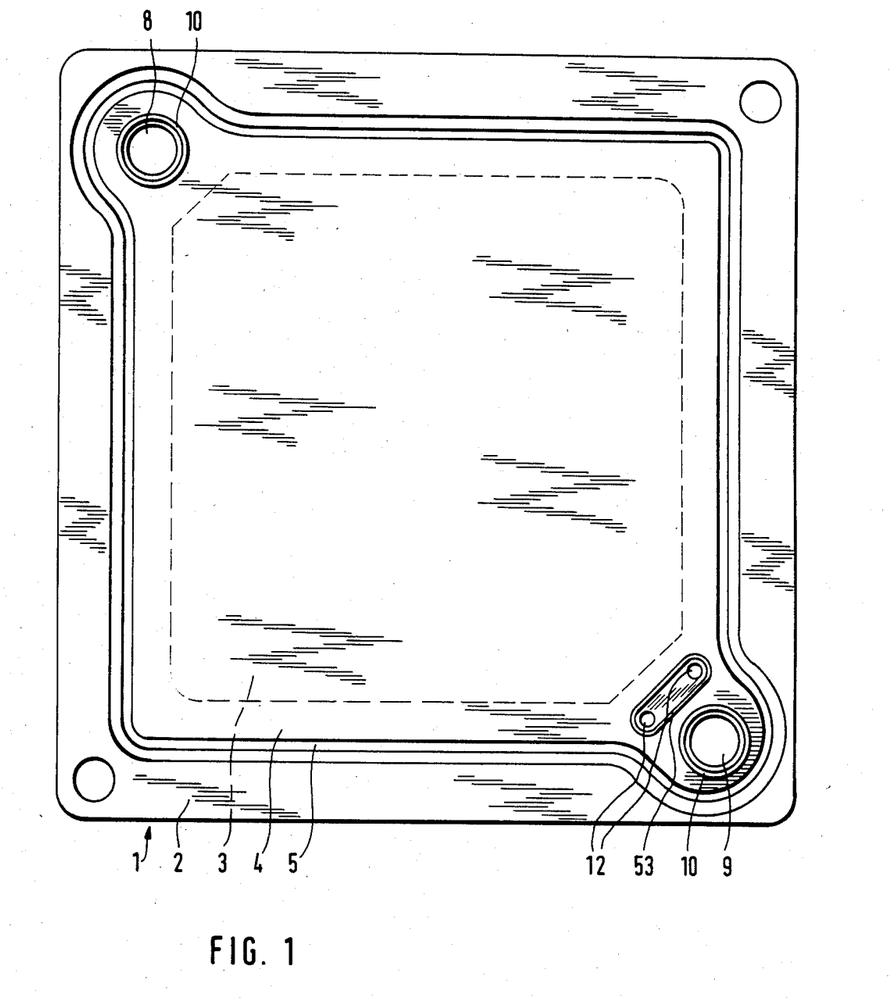
FIG. 1 is a view of the base plate

The base member 1 which is a one-piece member molded of plastic material, preferably polypropylene (FIG. 1) has a circumferential plane edge portion 2 surrounding a centrally arranged recess 3. In the region of the inclined transition 4 from the recess 3 to the edge portion 2 there is a groove 5 which serves to receive a projecting rib 6 on the membrane 7 (FIG. 3) which is molded of elastomeric material for example, synthetic rubber.

Figure 2:
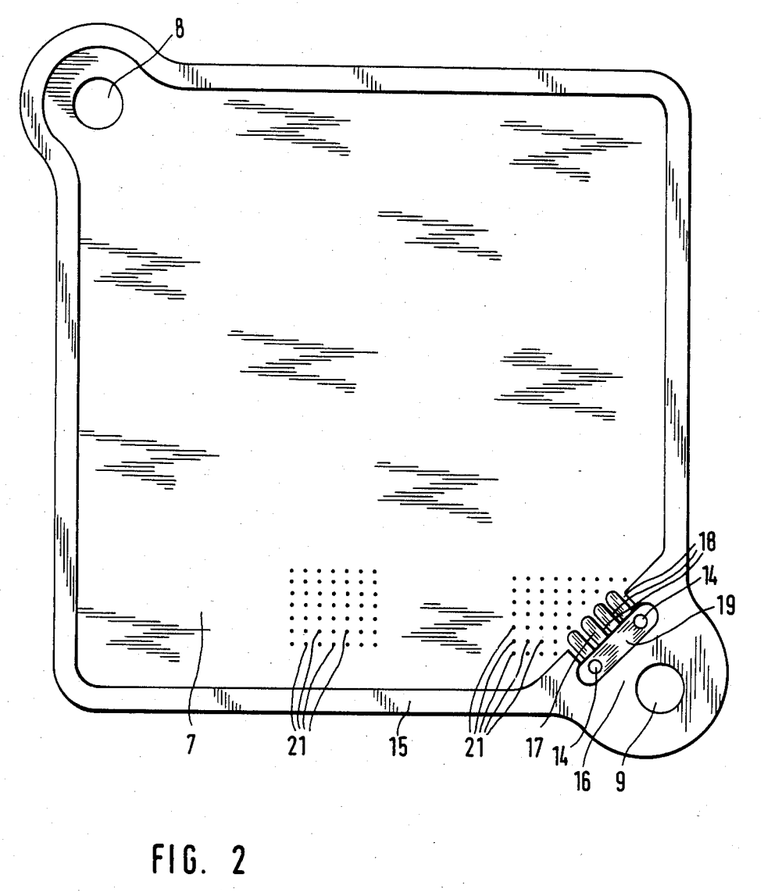
FIG. 2 is a view of the side of the membrane which is turned away from the base member
Figure 3:
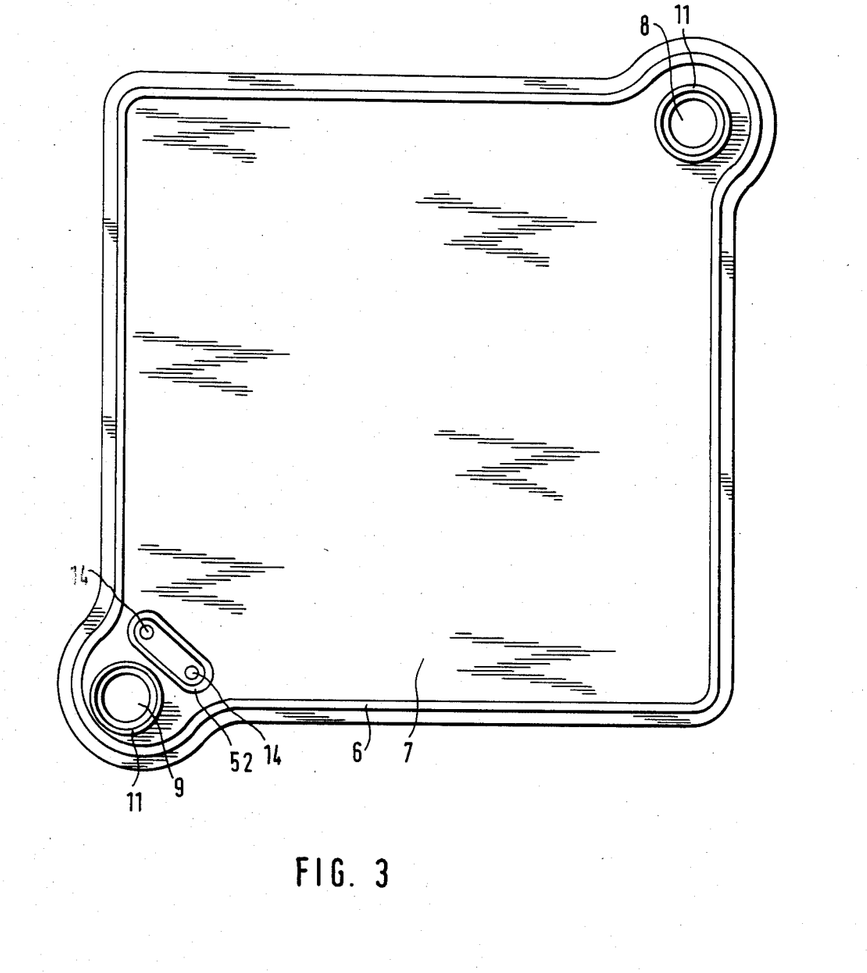
FIG. 3 is a view of the side of the membrane which is turned toward the base member

The base member (FIG. 1) is provided with an opening 8 for inflow of the suspension that is to be filtered and an opening 9 for the outflow of the filtrate. Around the suspension inlet 8 there is a groove 10 which serves for the reception of an annular rib 11 on the membrane 7 (FIG. 3). Around the filtrate outlet opening 9, there is a similar groove 10 and the membrane is provided with a like annular projecting rib 11. The filtrate flows out of the region between the membrane 7 and a filter cloth (not shown) through openings 14 in the membrane (FIG. 2) into openings 12 in the base plate (FIG. 1) which are connected by discharge channels 13 (FIG. 15) with the filtrate discharge 9.

Figure 4:
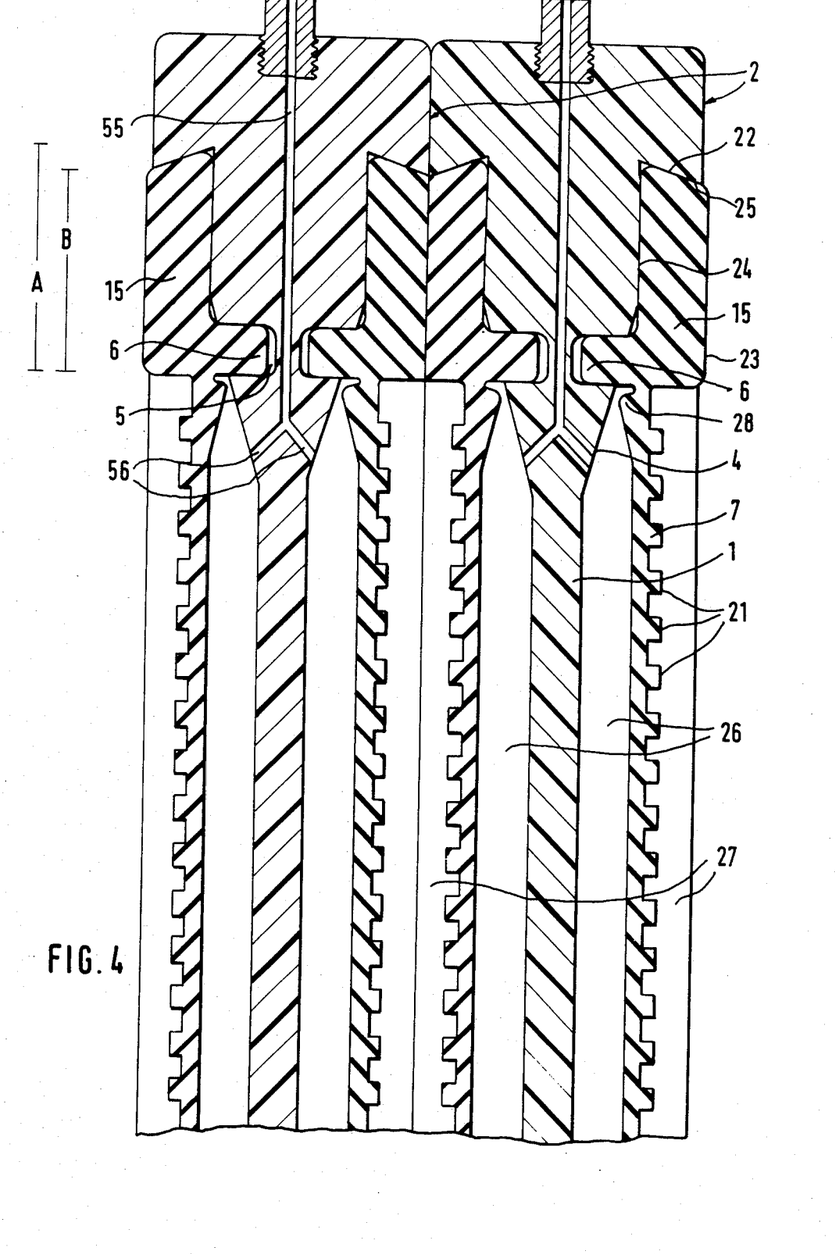
FIG. 4 is a cross-section through a part of two base members, each with two membranes

Plane edge 2 of the base member 1 serves as a sealing edge. Through an inclined undercut surface 22 there is formed a step adjacent the edge 2 (FIG. 4). Offset by the height of this step is a contact surface 24 for the outer upper face 23 of the membrane 15. This contact surface 24 goes into an inclined surface which forms the edge 4 of the recess 3. In this inclined surface, there is formed a groove 5 which receives the rib-like projection 6 which is arranged on the border 15 of the membrane 7. The projection 6 and the membrane edge 15 form an angle-form member that imparts a high stiffness to the membrane edge.

The outer edge of the membrane 7 forms an inclined surface 25 so that the width A of the side lying on the base plate is greater than the width B of the side turned away from the base plate. Through this formation there is obtained a secure seating of the membrane edge 15 on the base member 1.

When not stressed by pressure, the membrane 7 is planar. On the side turned away from the base member 1 the membrane is provided with a large number of small projections or knobs 21, in order to support the filter cloth (not shown) to form a flow path for the filtrate. Between the base member 1 and the membrane 7 there is a space 26 which in the course of the filter operation, becomes ever smaller. Between the membranes 7 of two adjacent base members 1 there is a space 27 into which the suspension is admitted and in which the solid material (filter cake) collects. In the course of the filtering operation, compressed air is admitted to the space 13 which puts the filter cake in the space 14 under pressure and thereby presses the remaining filtrate out of the space 14.

The outer upper face 23 of the membrane edge 15 stands in uncompressed condition a bit above the plane of the edge 2 of the base member 1. This is seen in FIG. 4 in both outer sides. In the middle of FIG. 4 there is illustrated how the geometry appears when the two base plates 1 are pressed together in the filter plate press. Then the edge surfaces 2 of the base member 1 lie tight against one another and the edge members 15 of the membranes are pressed together so that they lie in the same plane as the edges 2 of the base member 1.

In order to avoid strong bending stresses in the transition of the membrane 7 into the membrane edge 15, it can be advantageous to form a projection 28 wedge, shaped in cross-section on the membrane 7 before the transition region, as seen in FIG. 4.

Advantageously, the grooves 5 are formed so deep that some air remains between the inserted rib-like projection 6 of the membrane and the bottom of the groove 5 of the base plate.

Figure 12:
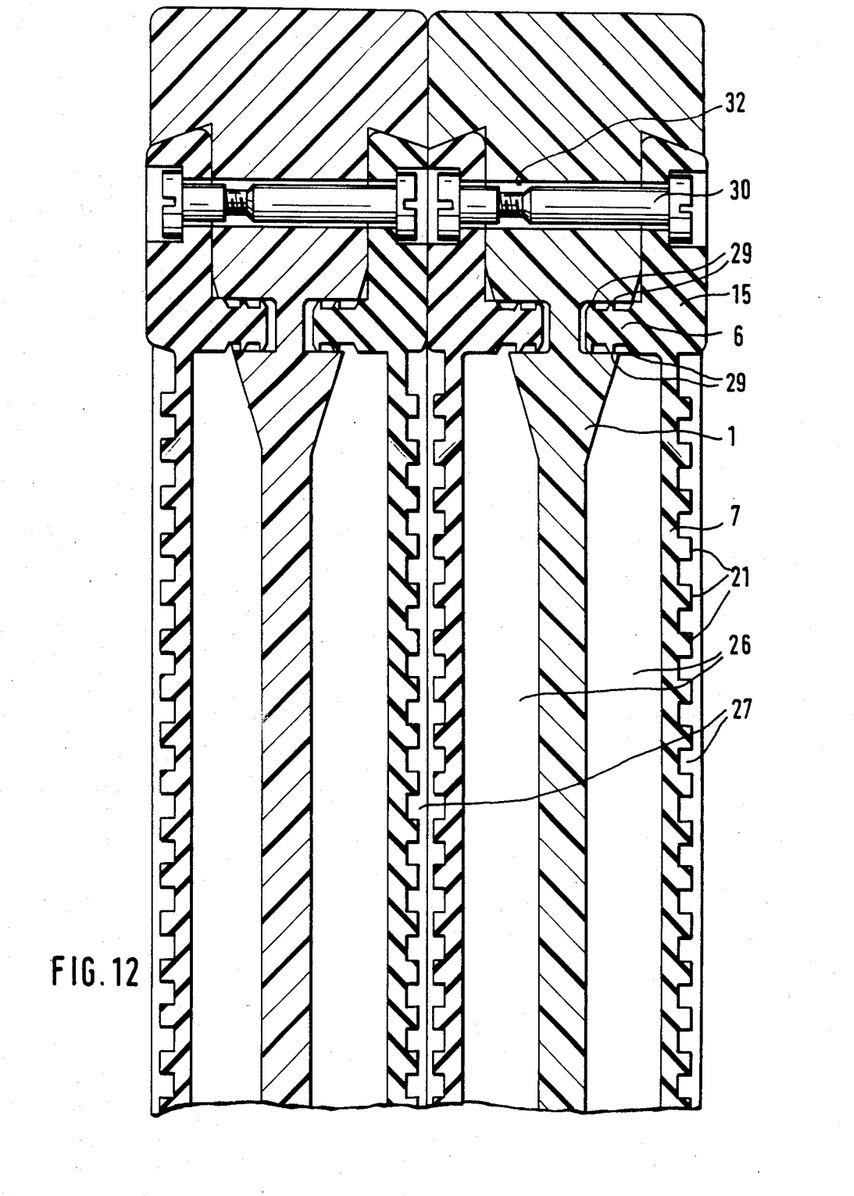
FIG. 12 is a cross-section through a part of two base plates with modified membranes

In the embodiment illustrated in FIG. 12 the membrane 7 is very tight on the plane of the sealing edge 2 which has the advantage that folding of the membrane 7 is fully prevented. The rib-like projection 6 carry on their sidewalls sealing ribs 29 which engage opposite sides of the grooves 5 in the base plate. By means of screws 30, the membranes 7 are secured on their edges on the base member 1 whereby the screws 30 pass through holes 32 distributed around pheripheral portions of the base member 1 and with their two heads clamp and secure the two membranes 7 of a membrane filter plate on the base member 1.

A pair of filter cloths (not shown) is installed between two adjacent membranes edge portions of the filter cloths being clamped between edge portions of the membranes. The inlet for introducing the suspension to be filtered between filter cloths of a pair is formed in the following manner as illustrated in FIGS. 5 to 11.

For the suspension inflow there is provided in the base member 1 an opening 8 which is surrounded by a groove 10. Also the membrane 7 and the filter cloth have such openings in this position. The membrane 7 and the filter cloth are secured to the base member 1 in this position by a three-part screwed joint 33, 34, 35. The three parts of the screwed joint are illustrated respectively in FIGS. 8, 9 and 10. The assembly of the parts is the screwed joint shown in FIG. 11.

Figure 10:
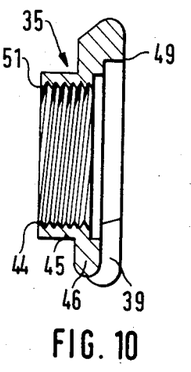
FIG. 10 is a section through a part of the screwed joint namely a pipe piece provided with a flange and an internal thread

The screwed joint comprises a part 33 which is composed of a pipe piece 36 having at one end a flange 37. On the side facing the filter cloth and the membrane 7, the flange 37 has circular concentric projecting ribs 38. The front side of the flange 11 is a smooth annular surface interrupted only by one or more radial recesses 39. In the assembled condition (FIG. 11) these radial recesses 39 form a channel for the inflow of the suspension from the suspension inlet 8 into the filter space 27 between two membranes 7 and associated filter cloths which are streched on the adjacent base members 1. The flange 37 has close to the transition point in the pipe piece, an annular recess 40. A flange 41 of the middle member 34 of the screwed joint engages in this annular recess 40. This flange 41 is on one end of the pipe piece 42 which on the other hand, has an external thread 43. This external thread 43 is adapted to be screwed into the internal thread 44 of the screwed joint part 35 which is shown in FIG. 10. This screwed joint part 35 comprises moreover a pipe piece 45 having thereon a flange 46 of which the end face can have a radial recess 39 which likewise can serve as a channel for the inflow of the suspension from the suspension inlet 8 into the filter space 27.

Figure 5:
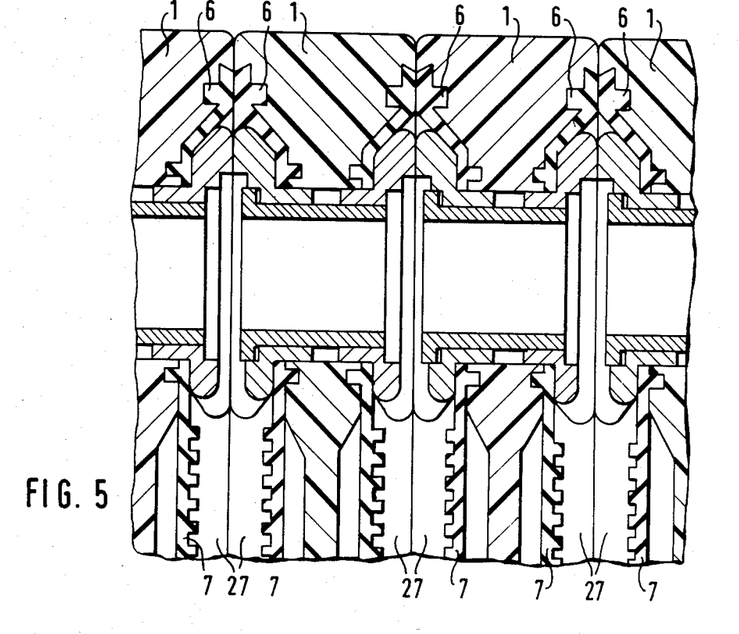
FIG. 5 is a cross-section through a part of a filter press in the region of the suspension inlet showing base members pressed together, each with two membranes
Figure 11:
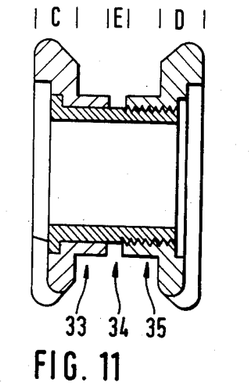
FIG. 11 is a section through the assembled screwed joint

The screwed joint 33, 34, 35 is shown in assembled condition installed in a filter press in FIG. 5. Essential to this filter press is that the middle screwed joint part 34 with its external thread 43 is screwed into the internal thread 44 of the screwed joint part 35 while the screwed joint part 33 is axially slidable between the flange 41 and the end face 47 of the other member 35 provided with flange 46 whereby the members 33 and 34 can be turned relative to one another. As can be seen in FIG. 11, the screwed joint part 33 has the possibility of moving axially a distance E.

Figure 6:
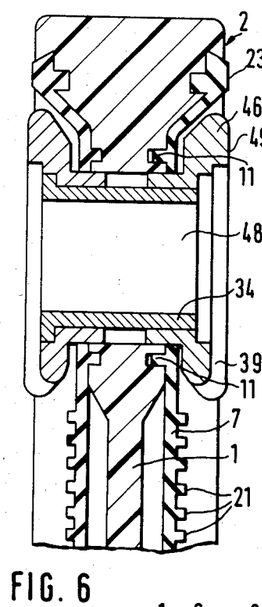
FIG. 6 is a section through a part of the membrane filter plate with an installed screwed joint
Figure 7:
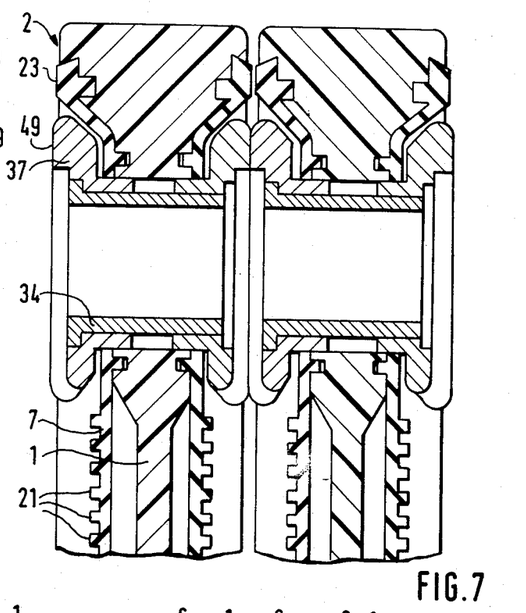
FIG. 7 is a section through adjacent parts of membrane filter plates with an installed screwed joint before the application of pressure to the filter press
Figure 8:
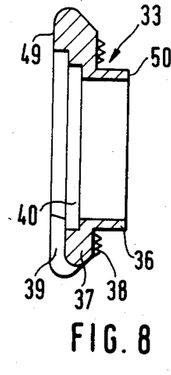
FIG. 8 is a section through one part of the screwed joint, namely an axially slidable pipe piece provided with a flange
Figure 9:
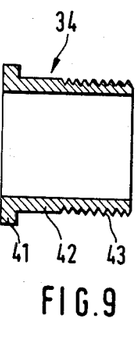
FIG. 9 is a section through a part of the screwed joint, namely a pipe piece provided at one end with a flange and at the opposite end with an external thread

In FIG. 6 it is shown how the screwed joint presses the membrane 7 on the base member 1. In the region of the suspension inflow 48 i.e. in the region of the opening 8 of the base member 1, the edge of the membrane 7 has an annular projecting rib 11 which is received in the groove 10 in the base plate 1. The flange 37 of the screw joint member 33 presses on the edge of the membrane 7 and thereby presses the rib 11 into the groove 10. The rib 11 cannot come out of the groove 10 so long as the screwed joint 33, 34, 35 is installed even when it is in a loose condition. The thickness of the flange 37 is so dimensioned that with an installed screwed joint 33, 34, 35 when the rib 11 lies in the groove 10 and the back side of the flange 37 lies on the membrane 7 so that the rib 11 cannot come out of the groove 10 the front face 49 projects somewhat beyond the sealing plane 2. If the membrane filter plate is now placed in a filter press as illustrated in FIG. 7, then the end faces 49 of adjacent flanges 37, 46 already touch one another when the sealing surfaces 2 do not yet touch. Between the outer surfaces of the membrane 15 and adjacent membrane 7 there is still advantageously some air. However, the dimensioning can also be chosen so that the outer surfaces of adjacent membrane edges 15 just touch one another when also the end faces of the flanges 37, 47 touch but there is still air between the edge planes 2 of adjacent base members 1 when in unpressed condition. If the inserted membrane filter plates in the filter press are now subjected to pressure as is illustrated in FIG. 5, the membrane filter plates are pressed together so that the air is expelled between the edge planes or sealing planes 2 whereby the end faces of the flanges 37, 46 are pressed tightly against one another and the flanges are pressed against the membranes 7 in the region of their rejecting ribs 11. There is thereby obtained a very tight connection between the membrane 7 and the screwed joint so that the suspension flowing into the filter space 27 cannot reenter the space between the membrane 7 and the base member 1. During this pressing together of the membrane filter plates, the flange 37 slides on the pipe piece 42 of the screwed joint part 34. As seen from FIG. 5, the end faces 50, 51 of the pipe pieces 36, 45 of the screwed joint parts 33, 35 are closer to one another than in the unpressed condition shown in FIG. 7.

As the actual pressure for pressing the membrane 7 on the base member 1 is first produced by the pressure of the filter press transmitted through the flanges 37, 46 the parts of the screwed joint can be produced of plastic material. For with this construction the pressure for pressing the membranes on the base members is not produced through screwing the external thread 43 on the internal thread 44 but only through the force of the filter press. Hence, no parts, e.g. the threads or the pipe pieces 36, 42, 45, can be torn out. The thick toroidal flanges 37, 46 on the other hand, are so stable that they can withstand the pressure applied to their outer faces without yielding.

Figure 13:
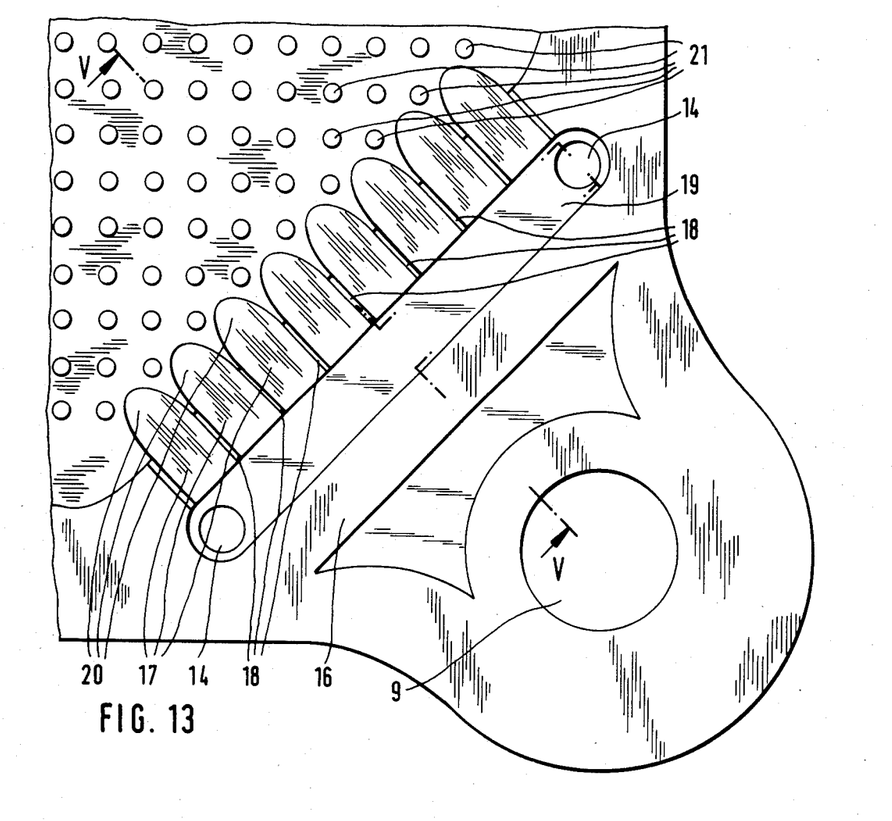
FIG. 13 is an enlarged view of a corner of the membrane with the filtrate outlet
Figure 14:
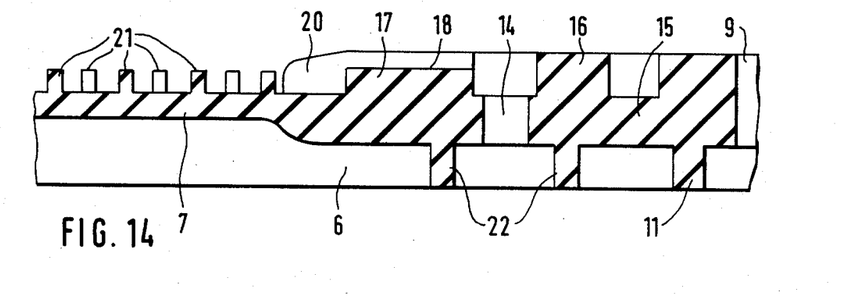
FIG. 14 is a cross-section taken on the line V—V in FIG. 13
Figure 15:
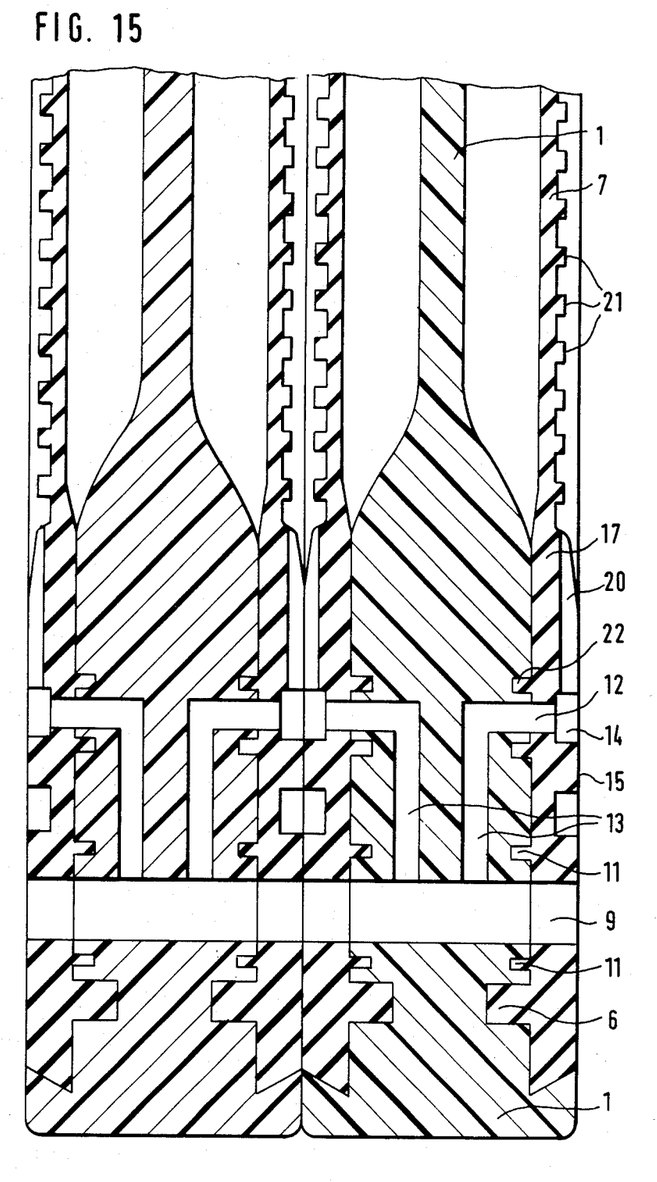
FIG. 15 is a cross-section through a part of two base plates with membranes in the region of the filtrate outlet in operating condition
Figure 17:
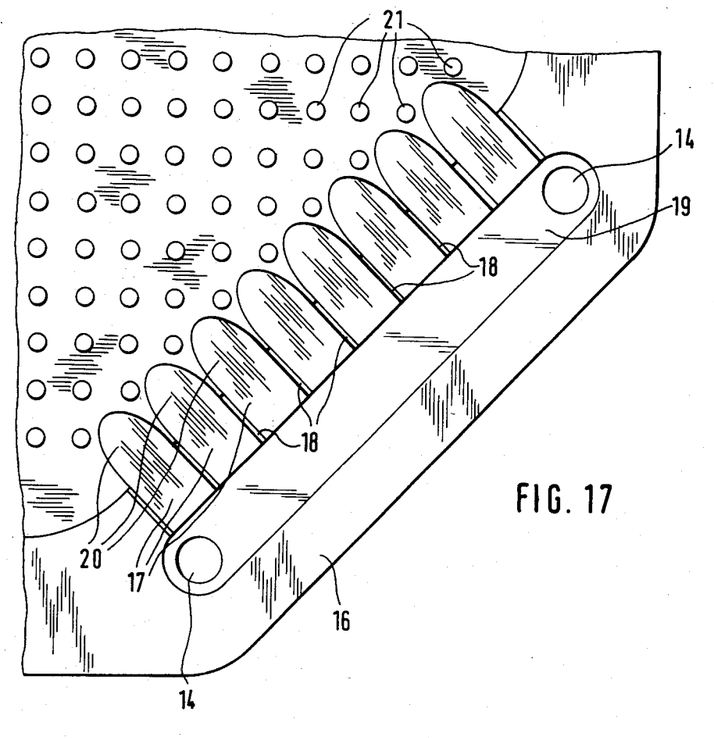

The outlet for the filtrate is formed in the following manner. In the region of the filtrate outlet opening 14 the essentially angle-form edge reinforcement 15 which surrounds the membrane as a frame, is divided into two webs 16, 17 of which the outer web 16 forms a seal to the outside while in the inner web 17 there are arranged spaced channel-like recesses 18 through which the filtrate from the space between the filter cloth and the membrane can flow into a channel-like recess 19 and from there through the opening 14 and the channels 13 into the filtrate discharge 9 (FIGS. 15 and 17). Portions of the web 17 between the channel recesses 18 are extended as tongues 20 toward the middle of the membrane to serve a supporting function. These tongues 20 taper in a direction toward the middle of the membrane 7 so that the supporting pins 21, which are distributed over the entire face of the membrane and relocated partly between the tongues 20 as seen in FIG. 13.

To improve the sealing, it is advantageous to provide on the side of the membrane facing the base member 1 an annular projection 52 (FIG. 3) which engages in a groove 53 in the base member 1 (FIG. 1) and which preferably is provided with sealing lips on its sides.

In use of the filter press, a plurality of base members and membranes are assembled as illustrated in FIG. 4 with pairs of membranes between adjacent base members and with a pair of filter cloths between adjacent membranes. The suspension to be filtered is fed under pressure through the inlet 8 into the channel formed by the screwed joints 33, 34, 35 and passes through the radial recesses 39 into spaces between adjacent filter cloths. The filtrate passes through the filter cloths into the spaces between the cloths and respective membranes 7, the filter cloths being spaced from the membranes by the projections 21. Solid particles of the suspension do not pass through the filter cloths and are retained between adjacent filter cloths. From the spaces between the filter cloths and the membranes, the filtrate passes through the channels 18 between tongues 20 into the recess 19 (FIG. 13) and from there flows through openings 14 in the membranes and openings 12 in the base plates through passages 13 into the filtrate outlet 9 (FIG. 15). When a quantity of solid material has been collected between pairs of filter cloths, compressed air is introduced through passages 55, 56 in the base members into the spaces between the base members and the membranes thereby applying pressure through the membranes to the filter cloths to compress the solid material into a filter cake. The press is then opened and disassembled to remove the filter cakes.

Figure 16:
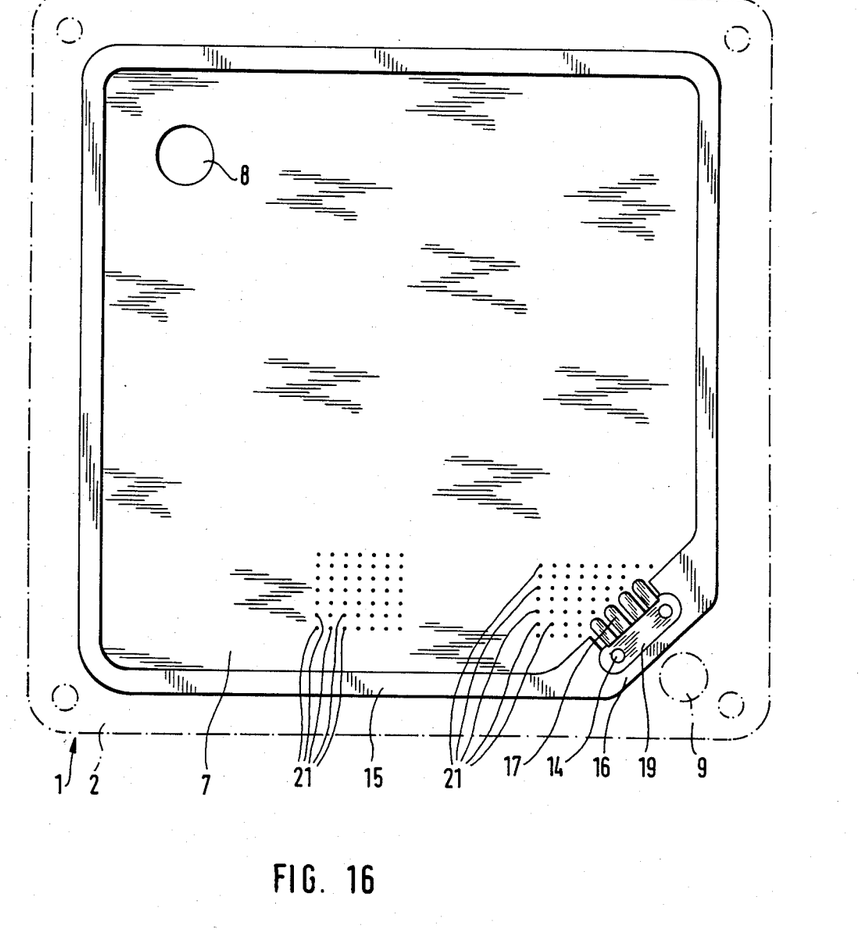
FIG. 16 is a view of another embodiment of membrane and FIG. 17 is an enlarged view of a corner portion of the membrane shown in FIG. 16.

In the embodiment illustrated in FIGS. 16 and 17 the membrane lacks the projection that extends around the filtrate outlet 9. The openings 14 are here connected through the outflow channels 13 with the filtrate outlet 9 formed only in the base member 1 shown in dotted lines in FIG. 16. Moreover, the suspension inlet 8 is arranged farther toward the middle of the diaphragm. The membrane surfaces are here smaller for better surface efficiency.

What is claimed is:

1. A membrane filter press comprises a plurality of membranes of elastomeric material sandwiched between base plates, each of said base plates having a central recess bounded by an inclined surface sloping up to a lower inner peripheral portion surrounded by a higher outer peripheral portion and having a circumferential groove adjacent the boundary between said inclined surface and said lower inner peripheral portion, and each of said membranes being substantially planar non-cup-shaped in unstressed condition and having a marginal portion seating on said lower inner peripheral portion of said base plate and having a thickness slightly greater than the difference in height between said lower inner peripheral portion and said higher outer peripheral portion, and a circumferential rib received in said groove of said base plate, surfaces of said higher outer peripheral portions of adjacent base plates seating on one another in compressed condition of said press and constitution sealing surfaces providing a pressure seal between adjacent base plates.

2. A membrane filter press according to claim 1, in which said base plate has an inclined under-cut shoulder between said lower inner peripheral portion and said higher outer peripheral portion and in which the marginal edge of said diaphragm is wedge-shaped and abuts said shoulder.

3. A membrane filter press according to claim 1, in which opposite side walls of said rib of said membrane and side walls of said groove of said base plate are parallel to one another.

4. A membrane filter press according to claim 1, in which side walls of said rib of said membrane and side walls of said groove of said base plate are perpendicular to the plane of said membrane.

5. A membrane filter press according to claim 1, in which an inlet opening in said base plate and membrane is surrounded by an annular rib of said membrane received in an annular groove in said base plate, and in which a filter cloth and said membrane are clamped on said base plate by a screwed joint disposed in said inlet opening.

6. A membrane filter press according to claim 5, in which said screwed joint comprises two flanged pipe pieces joined by an intermediate pipe piece having at one end an externally threaded portion screwed into internal threads of one of said flanged pipe pieces and at the other end a flange received in an annular recess of the other of said flanged pipe pieces, whereby said other flanged pipe piece is rotatable and axially movable on said intermediate pipe piece.

7. A membrane filter press according to claim 6, in which flanges of said flanged pipe pieces are so thick that in free condition they extend at least to the planes of said outer peripheral portions of said base plate, whereby end faces of said flanges engage end faces of flanges of adjacent screwed joints in assembled condition of the press, and in which said flanges have at least one radial recess providing an inlet flow passage to the interior of said press.

8. A membrane filter press according to claim 6, in which the three-piece screwed joints are of plastic material.

9. A membrane filter press according to claim 6, in which on the inner face of the flange of said flanged pipe pieces there is at least one annular projection pressed against said filter cloth and membrane.

10. A membrane filter press according to claim 5, in which said base plate has said recesses on both sides and in which two membranes and two filter cloths are clamped on opposite sides of said base plate by said screwed joint.

11. A membrane filter press according to claim 1, in which said base plate is molded one-piece of plastic material.

12. A membrane filter press according to claim 1, in which said rib of said membrane has a height less than the depth of said groove of said base plate whereby there is a space at the bottom of said groove.

13. A membrane filter press according to claim 1, in which said rib of said membrane has on at least one side at least one sealing lip engaging a side of said groove in said base plate.

14. A membrane filter press according to claim 1, in which said base plate has said recesses on both sides and in which membranes and filter cloth are disposed on opposite sides of the base plate.

15. A membrane filter press according to claim 1, in which adjacent a filtrate oulet opening, said marginal portion of said membrane is divided into an outer web portion and an inner web portion with a recess between them, said inner web portion being traversed by a plurality of channels leading from the interior of the press to said recess, and in which a discharge passage is provided for conducting filtrate from said recess to said filtrate outlet opening.

16. A membrane filter press according to claim 15, in which portions of said inner web portion between said channels extend toward the interior of said press as tapered tongues.

17. A membrane filter press according to claim 15, in which said discharge passage comprises an outlet opening in said membrane and a communicating passage in said base plate.

18. A membrane filter press according to claim 17, in which an annular rib on said membrane surrounding said outlet opening is received in an annular groove in said base plate.

19. A membrane filter press according to claim 1, in which said base plate is provided with a pasaage for introducing compressed air between the base plate and the membrane.

20. A membrane filter press according to claim 1, in which said membrane has on the side facing away from the base plate in an area overlying said recess of the base plate a multiplicity of small projections distributed over the surface of said membrane.

21. A member filter press according to claim 1, in which the said groove of said base plate has a width at its outer portion at least as great as the width at its inner portion whereby said groove is free of undercut.

* * * * *